United States Patent
Strutz

(10) Patent No.: US 6,648,252 B2
(45) Date of Patent: Nov. 18, 2003

(54) SWITCHED RELUCTANCE MACHINE AND FOOD WASTE DISPOSER EMPLOYING SWITCHED RELUCTANCE MACHINE

(75) Inventor: William F. Strutz, Racine, WI (US)

(73) Assignee: Emerson Electric Co., St. Louis, MO (US)

( * ) Notice: Subject to any disclaimer, the term of this patent is extended or adjusted under 35 U.S.C. 154(b) by 0 days.

(21) Appl. No.: 09/777,126

(22) Filed: Feb. 5, 2001

(65) Prior Publication Data

US 2002/0104909 A1 Aug. 8, 2002

Related U.S. Application Data

(60) Provisional application No. 60/238,100, filed on Oct. 4, 2000.

(51) Int. Cl.[7] .................................................. B02L 23/36
(52) U.S. Cl. ................................. 241/46.013; 241/101.2
(58) Field of Search ........................ 241/46.013, 101.2; 318/254, 701; 310/168

(56) References Cited

U.S. PATENT DOCUMENTS

| | | | |
|---|---|---|---|
| 2,495,983 A | 1/1950 | Richards | 241/257 |
| 2,579,400 A | 12/1951 | Schindler | 241/257 |
| 2,743,875 A | 5/1956 | Brezosky et al. | 241/100.5 |
| 2,782,997 A | 2/1957 | Wolff | 241/46 |
| 2,951,650 A | 9/1960 | Gould | 241/286 |
| 2,978,190 A | 4/1961 | Brucken et al. | 241/46 |
| 3,025,007 A | 3/1962 | Wieczorek | 241/100.5 |
| 3,443,764 A | 5/1969 | Wetzel | 241/46 |
| 3,534,913 A | 10/1970 | Lawrenson | 241/36 |
| 3,589,624 A | 6/1971 | Smith | 241/46.08 |
| 3,875,462 A | 4/1975 | Kiefer et al. | 317/13 R |
| 4,134,555 A | 1/1979 | Rosselet | 241/46 B |
| 4,187,441 A | 2/1980 | Oney | 310/112 |
| 4,373,676 A | 2/1983 | Sherman, Jr. | 241/36 |
| 4,526,518 A | 7/1985 | Wiernicki | 417/420 |
| 4,573,642 A | 3/1986 | Spelber | 241/46 B |
| 4,618,790 A | 10/1986 | Kakuda et al. | 310/90 |
| 4,633,149 A | 12/1986 | Welterlin | 318/254 |
| 4,665,286 A | 5/1987 | Hansen | 200/80 R |
| 4,776,523 A | 10/1988 | Hurst | 241/46 B |
| 4,793,561 A | 12/1988 | Burda | 241/36 |

(List continued on next page.)

FOREIGN PATENT DOCUMENTS

| | | | | |
|---|---|---|---|---|
| EP | 0 677 915 A1 | 10/1995 | | H02K/23/54 |
| JP | 53047908 | 4/1978 | | H02K/21/24 |
| JP | 58130759 | 8/1983 | | H02K/23/54 |
| JP | 59101720 | 6/1984 | | H01H/11/00 |
| JP | 60249859 | 12/1985 | | H02K/29/00 |
| JP | 61161946 | 7/1986 | | H02K/23/54 |
| JP | 61161947 | 7/1986 | | H02K/23/54 |
| JP | 61161948 | 7/1986 | | H02K/29/00 |
| JP | 2000050604 | 2/2000 | | H02K/29/00 |
| JP | 2001-121021 A | 5/2001 | | B02C/21/00 |
| WO | WO 00/64035 | 10/2000 | | H02K/21/24 |

OTHER PUBLICATIONS

Appliance Manufacturer, "Novel Brushless DC Motors", Jan. 2001.
International Search Report for PCT Application No. PCT/US01/30279 dated Jan. 22, 2002.
International Search Report for PCT Application No. PCT/US01/44609 dated May 13, 2002.

*Primary Examiner*—William Hong
(74) *Attorney, Agent, or Firm*—Howrey Simon Arnold & White, LLP; Jeffrey J. Phillips

(57) ABSTRACT

A reluctance machine includes a stator having an annular support member with a plurality of stator poles disposed thereon. The stator poles each are formed from a corresponding foil coil stator winding. A solid disc-shaped rotor defines a plurality of salient rotor poles, and is rotatably positioned opposite the support member to establish an axial air gap between the rotor and stator poles. A food waste disposer incorporates such a reluctance machine.

47 Claims, 5 Drawing Sheets

U.S. PATENT DOCUMENTS

| | | | |
|---|---|---|---|
| 4,819,460 A | 4/1989 | Obradovic | 68/23.7 |
| 4,841,393 A | 6/1989 | MacLeod et al. | 360/98.07 |
| 4,888,512 A | 12/1989 | Shimizu | 310/156 |
| 4,917,311 A | 4/1990 | Yoshino et al. | 241/36 |
| 4,998,052 A | 3/1991 | Erdman et al. | 318/701 |
| 5,111,096 A | 5/1992 | Horst | 310/168 |
| 5,129,590 A | 7/1992 | Shinya | 241/46.013 |
| 5,335,866 A | 8/1994 | Narao | 241/46.013 |
| 5,370,323 A | 12/1994 | Narao | 241/46.013 |
| 5,545,938 A | 8/1996 | Mecrow | 310/156 |
| 5,646,467 A | 7/1997 | Floresta et al. | 310/268 |
| 5,676,319 A | 10/1997 | Stiggins et al. | 241/46.012 |
| 5,687,918 A | 11/1997 | Kubota et al. | 241/23 |
| 5,789,841 A | 8/1998 | Wang | 310/179 |
| 5,866,965 A | 2/1999 | Baronosky et al. | 310/208 |
| 5,897,066 A | 4/1999 | Bacon et al. | 241/160 |
| 5,982,069 A | 11/1999 | Rao | 310/208 |
| 6,007,006 A | 12/1999 | Engel et al. | 241/46.014 |
| 6,014,003 A | 1/2000 | French | 318/701 |
| 6,051,942 A | 4/2000 | French | 318/254 |
| 6,239,530 B1 * | 5/2001 | Garcia | 310/12 |
| 6,259,233 B1 * | 7/2001 | Caamano | 310/179 |

* cited by examiner

SWITCHED RELUCTANCE MACHINE AND FOOD WASTE DISPOSER EMPLOYING SWITCHED RELUCTANCE MACHINE

CROSS-REFERENCE TO RELATED APPLICATIONS

This application claims the benefit of U.S. Provisional Application No. 60/238,100 filed on Oct. 4, 2000, which is incorporated herein by reference in its entirety. This application is related to application Ser. No. 09/777,129 entitled "Food Waste Disposer Having a Variable Speed Motor," by Strutz et al., filed concurrently herewith, the disclosure of which is incorporated herein by reference in its entirety.

BACKGROUND OF THE INVENTION

1. Field of the Invention

The invention relates generally to reluctance machines, and more specifically, to a foil coil switched reluctance machine and a food waste disposer employing a switched reluctance machine.

2. Description of Related Art

Reluctance machines are well known in the art. In general a reluctance machine is an electric machine in which torque is produced by the tendency of a movable part to move to a position where the inductance of an excited winding is maximized (i.e., the reluctance is minimized).

In one type of reluctance machine the phase windings are energized at a controlled frequency. This type of reluctance machine is generally referred to as a synchronous reluctance machine. In another type of reluctance machine, circuitry is provided to determine the position of the machine's rotor, and the windings of a phase are energized as a function of rotor position. This type of reluctance machine is generally referred to as a switched reluctance machine. Although the description of the current invention is in the context of a switched reluctance machine, the present invention is applicable to all forms of reluctance machines, including synchronous and switched reluctance motors and to other machines that have phase winding arrangements similar to those of switched reluctance machines.

The general theory of design and operation of switched reluctance machines is well known and discussed, for example in "The Characteristics, Design and Applications of Switched Reluctance Motors and Drives," by Stephenson and Blake, presented at the PCIM '93 Conference and Exhibition at Nuremberg, Germany, Jun. 21–24, 1993.

In general, known reluctance machines have been designed with a stator yoke having inwardly projecting salient poles. The rotor also defines salient poles and typically contains no circuitry or permanent magnets. The rotor and the stator are coaxial. Associated with each stator pole is a coil of wire wound around the pole. The stator poles, which are positioned opposite one another, are generally coupled to form one or more phases. A phase is energized by delivering current to the coil. Switching devices are generally provided which allow the coil to be alternately connected into a circuit which delivers current to the coil when the phase is energized and one which separates the coil from a current source when the phase is de-energized, and which may recover energy remaining in the winding.

Reluctance torque is developed in a reluctance machine by energizing a pair of stator poles when a pair of rotor poles is in a position of misalignment with the energized stator poles. The degree of misalignment between the stator poles and the rotor poles is called the phase angle. Energizing a pair of stator poles creates a magnetic north and south in the stator pole pair. Because the pair of rotor poles is missaligned with the energized stator poles by some phase angle, the inductance of the stator and rotor is less than maximum. The pair of rotor poles will tend to move to a position of maximum inductance with the energized windings. The position of maximum inductance occurs when the rotor and stator poles are aligned.

At a certain phase angle in the rotation of the rotor poles to the position of maximum inductance, but typically before the position of maximum inductance is achieved, the current is removed from the phase de-energizing the stator poles. Subsequently, or simultaneously, a second phase is energized, creating a new magnetic north and south pole in a second pair of stator poles. If the second phase is energized when the inductance between the second pair of stator poles and the rotor poles is increasing, positive torque is maintained and the rotation continues. Continuous rotation is developed by energizing and de-energizing the stator poles in this fashion. The total torque of a reluctance machine is the sum of the individual torques described above.

In general, most known reluctance machines have been designed with a stator yoke having inwardly projecting salient poles and a hollow core area. Nested concentrically in the hollow core area, or stator bore, is a rotor having outwardly projecting salient poles, defining a radial air gap between the rotor and stator poles. The rotor is connected to a rotor shaft that is free to rotate and acts as an output shaft when the machine is motoring, and as an input shaft when the machine is generating. The stator and rotor are typically constructed from stacks of laminations stamped from a magnetic material to reduce eddy current losses, among other things. The axial length of such conventional switched reluctance machines is not suitable for many applications. Further, the laminated construction of typical reluctance machines complicates the assembly process.

The present invention addresses shortcomings associated with the prior art.

SUMMARY OF THE INVENTION

The present invention relates to reluctance electric machines such as motors and generators, and more particularly to a variable reluctance machine designed for efficient operation and improved volumetric efficiency by using foil coil, concentrated stator pole windings on a solid or semi-solid salient pole stator, a minimum axial air gap and a solid, salient pole disc-shaped rotor. This unit is more easily produced than a more conventional laminated structure. The eddy current losses may be higher than a conventional laminated structure as is found in the prior art, but applications such as food waste disposers, sump pumps, ceiling fans, furnace blower motors, etc. have water or air cooling integral to the product.

In accordance with aspects of the present invention, a switched reluctance machine includes a stator having an annular support member with a plurality of stator poles disposed there on. The stator poles each comprise a corresponding foil coil stator winding. A solid disc-shaped rotor defines a plurality of salient rotor poles. The rotor is rotatably positioned opposite the support member to establish an axial air gap between the rotor and stator poles. A control circuit controls energization of the phase windings to create torque.

In accordance with further aspects of the invention, a food waste disposer incorporates a switched reluctance machine, and includes an inlet for receiving food waste, a grinding plate connected to a rotatable shaft, and a switched reluctance motor operable to drive the shaft and thus, the grinding plate to grind food waste received via the inlet into particulate matter. In exemplary embodiments, the switched reluctance motor includes a stator having a plurality of stator poles disposed therein, where each stator pole comprises a corresponding foil coil stator winding. A solid disc-shaped rotor defines a plurality of salient rotor poles, and the rotor is rotatably positioned proximate the stator to establish an axial air gap between the rotor and stator poles. The grinding plate may be integrally formed with the rotor.

In certain embodiments of the invention, a food waste disposer includes an inlet for receiving food waste, a stationary shredder ring, and a grinding plate situated adjacent the stationary shredder ring. The grinding plate has first and second sides, with the first side having at least one lug attached thereto. The second side has a plurality of rotor poles formed therein. A stator includes a plurality of stator poles disposed therein, each of which is formed from a corresponding foil coil stator winding. A shaft is rotatably received by the stator, and the grinding plate is fixed to the shaft to rotate therewith such that the grinding plate and the stator form an axial air gap therebetween. The stator may be sealed relative to the shaft and grinding plate to allow particulate matter and water to flow from the grinding plate over the stator.

BRIEF DESCRIPTION OF THE DRAWINGS

Other objects and advantages of the invention will become apparent upon reading the following detailed description and upon reference to the drawings in which.

Figure 1:
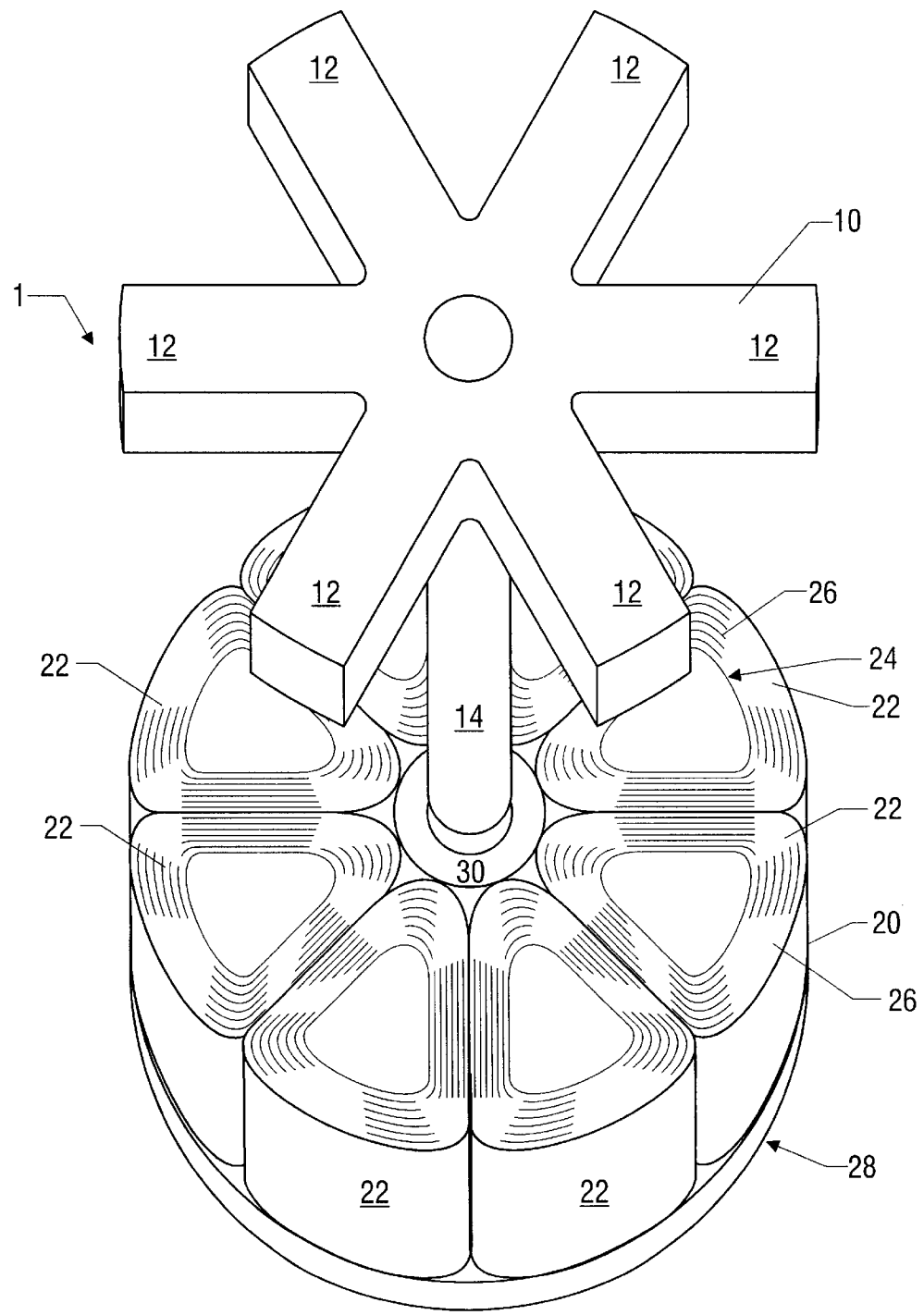
FIG. 1 is an exploded perspective top view of the major parts of a switched reluctance machine in accordance with an embodiment of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention.

DETAILED DESCRIPTION OF THE INVENTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

FIG. 1 illustrates an exemplary embodiment of a reluctance machine in accordance with the present invention shown in an exploded view. For simplicity, the term "motor" is used throughout this specification. However, one skilled in the art having the benefit of this disclosure will understand that the present invention is applicable to any type of rotating reluctance electric machine, including motors and generators.

The machine 1 includes a rotor 10 and a stator 20. The rotor includes a plurality of rotor poles or teeth 12, which could be of different shapes to provide optimum flux paths, minimize the material content, or improve self-cooling features. The stator 20 includes a plurality of poles 22, each comprising a form 24 with a foil coil winding 26 surrounding the form 24. The foil coil winding 26 is detailed in FIG. 2 and described further below. The form 24 serves to provide the basic coil shape, the structural support for the coil 26, the means to attach the coil 26 to the stator base and the flux core for the winding.

The rotor 10 is connected to a shaft 14, which functions as a supporting or guiding member for the rotor 10. The shaft 14 could also provide a connection point for additional power output. The stator 20 includes a stator base 28 that provides structural support for the coils and a bearing support structure 30. The stator base 28 also provides a flux return path for the flux producer by the coil winding. The bearing support structure 30 could be one of a number of various configurations, sizes, materials, etc.

The stator base 28 may be formed from materials such as sintered, powdered or cast, ductile iron and when the area of the flux path is optimized for optimum operation of the motor, the eddy current losses can be minimized. There are a number of possible rotor-stator pole and winding combinations. A few of the many possible combinations are as follows:

4-phase, 8-stator pole, 6-rotor pole, with two poles active simultaneously 3-phase, 12-stator pole, 8-rotor pole, with four poles active simultaneously 3-phase, 6 stator pole, 4 rotor pole, with two poles active simultaneously The stator pole pairs are electrically connected together, energized simultaneously and switched sequentially to produce rotation. With the different number of poles 12, 22 on the rotor 10 and the stator 20, the ferromagnetic rotor 10 rotates by solenoid action as it tries to line up with pairs of concentrated, non-overlapping stator poles 22. An associated position-sensing device (shown in FIG. 4) senses rotor position and velocity by one of a number of possible schemes and provides the switching sequence for proper commutation.

Figure 2:
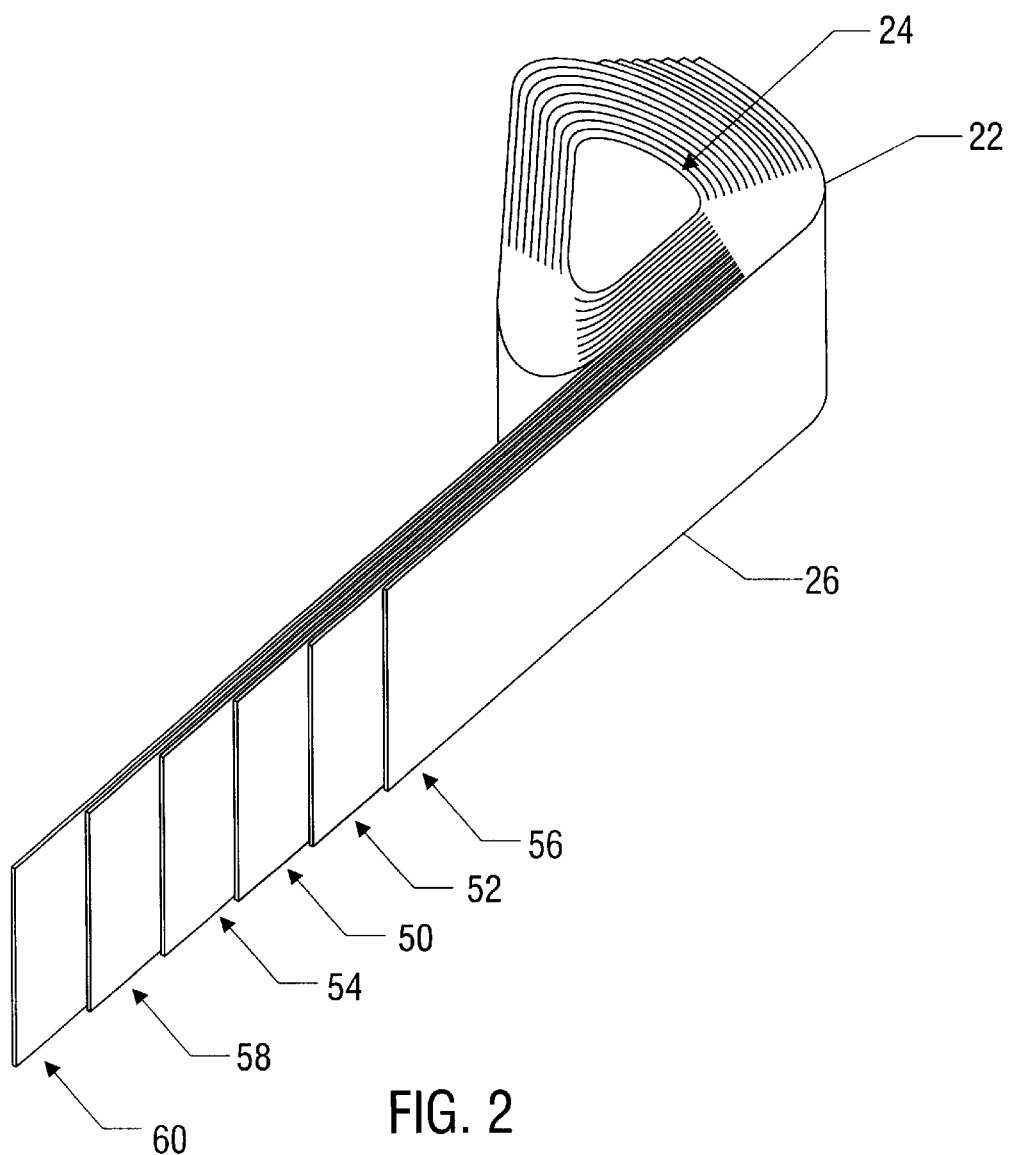
FIG. 2 illustrates the detail of an exemplary configuration of a foil coil winding suitable for use in the machine shown in FIG. 1.

FIG. 2 illustrates the form 24 and coil 26 of the stator pole 22. The coil 26 includes conductor material 50 which could typically be 1 to 10 or more mils thick and typically 0.2 to 2 or more inches wide. The material 50 could be copper, aluminum, a super conductor, or any other suitable conducting material. An insulation film 52, which could be one of many polymers, is attached to the conductor 50. The anodized surface of an aluminum conductor; an electro deposition or other type coating on the conductor; or an adhesive could serve as the insulation 52.

A second insulation layer 54 similar to the insulation 52 may be attached to the opposite side of the foil conductor 50. The second insulation layer 54 may or may not be required depending upon the winding configuration and processing techniques. An adhesive 56 bonds the turns together, or alternatively, depending upon the materials used, could serve as the insulation itself Similarly, a second adhesive layer 58 may also be required.

An optional layer of foil 60 may be integral to each turn. The foil 60 may be included for only a portion of or included for all of the turns of the winding. This optional layer or foil 60 could serve several possible functions: ferromagnetic foil could serve as a laminated part of the flux return path to reduce eddy current losses and allow the coil form to be reduced in size while at the same time it could serve as an inductively coupled current sensor or as an integral back EMF-position sensor or as a part of the input power conducting path or as a combination of some of the above functions. Copper, aluminum or some other conducting material could serve as a current or back EMF sensor or as an equivalent circuit path to the first conductor 50 to provide another turn which could be connected in parallel or series with the first conductor 50 to facilitate simple accommodation of a multiple voltage winding.

Figure 3:
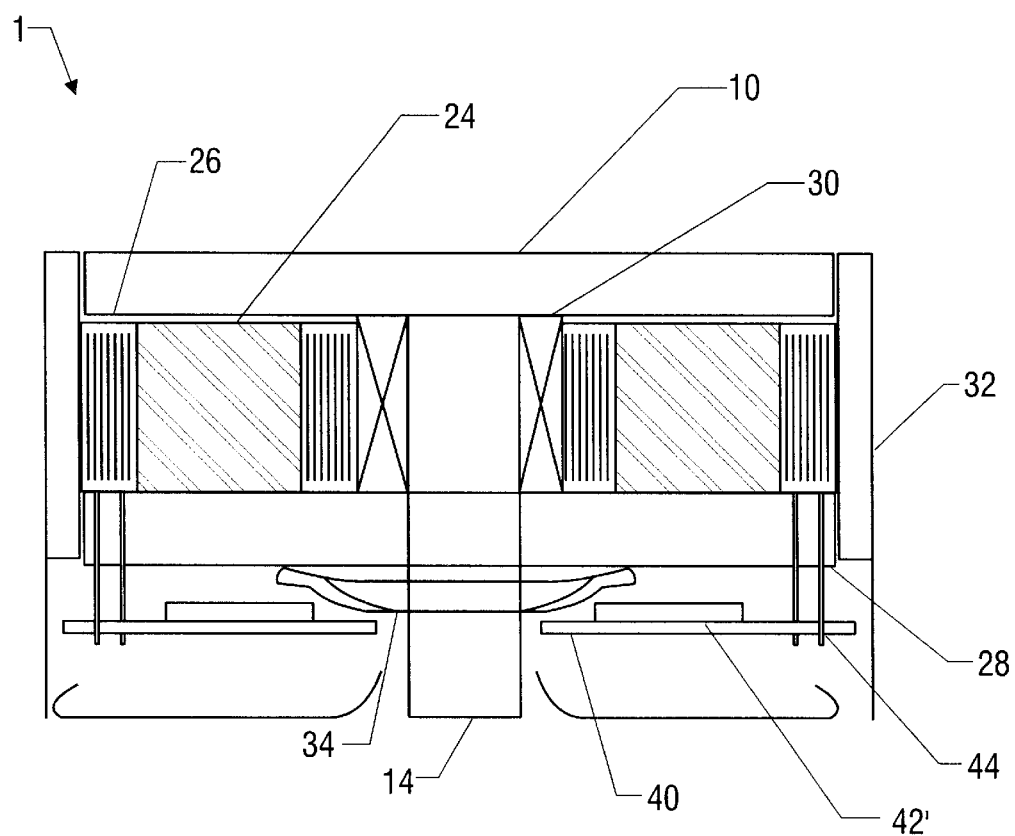
FIG. 3 is a cross-section of a switched reluctance machine in accordance with an embodiment of the present invention.

FIG. 3 is a cross-section of the motor 1. An outer housing 32 surrounds the machine structure and provides structural support. As previously shown in FIG. 1, the stator base 28 provides structural support for the bearing 30 and a flux return path.

The rotor 10, which could have many possible configurations, is connected to the shaft 14 and situated at the top surface to establish an approximately constant axial air gap thickness between the rotor and stator poles. The disk shaped rotor 10 provides special features and may be attached directly to a number of fan, blower, impeller, etc. type mechanisms. The disk-shaped rotor allows such mechanisms to be incorporated with the rotor rather than separately affixed to the shaft, simplifying the device and reducing the space requirements. The foil coil form 24 provides support structure and flux path for the foil coil 26. A fan 34 is connected to the shaft 14, providing cooling for the stator base and the electronic circuit. Since steel losses are a function of frequency (or motor speed) as is fan induced airflow, increased fan cooling compensates for increased steel losses as the speed increases. A printed circuit (PC) board 40 is positioned below the stator base 28. The components 42 of the drive electronics are situated on the PC board 40 in a conventional manner. The drive circuitry is connected to the windings 22 via leads 44.

Figure 4:
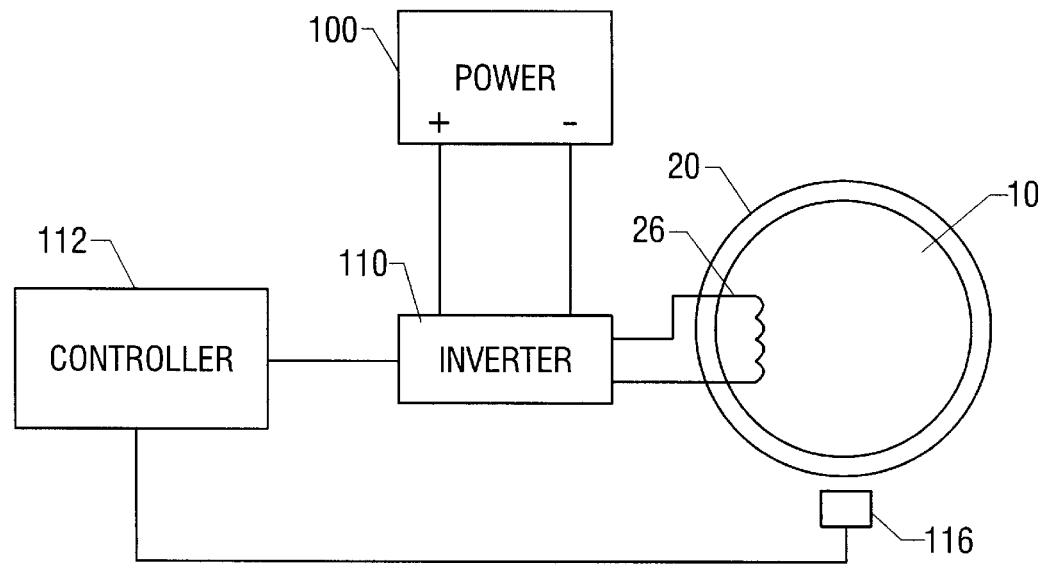
FIG. 4 is a block diagram schematically illustrating a control circuit in accordance with embodiments of the present invention.

FIG. 4 illustrates an exemplary system for energizing the machine 1. The system includes a source of DC power 100, a power inverter 110 coupled to receive the DC power, a controller 112 coupled to provide actuation signals to the gates of power switching devices in the inverter 110. The foil coil windings 26 of the machine 1 are coupled and adapted for energization by the power inverter 110. A rotor position transducer 116 provides position information to the controller 112. As noted herein above, rotor position information may be provided by any of several different methods and devices that would be apparent to one skilled in the art having the benefit of this disclosure. The use of the rotor position transducer 116 may be eliminated via any of several sensorless position sensing schemes known in the art.

The source of DC power 100 includes positive and negative buses. The positive and negative DC buses may be provided by any suitable source of DC power including a battery, an AC-DC converter, or the like. The power inverter 110 receives the DC power and delivers the power to the respective phase windings 26 in response to switching signals provided by the controller 112. The power inverter 110 may be constructed in a conventional fashion and may include a half-bridge switching arrangement, a full-bridge switching arrangement or any other type of switching arrangement that is capable of providing excitation currents as desired to the windings 26.

The switching signals that are applied to the power inverter 110 are generated by the controller 112. In certain embodiments of the invention, the controller 112 generates the switching signals in response to the rotor position information provided by rotor the position transducer 116, which may comprise Hall effect sensors, reluctance sensors, optical sensors, capacitive sensors, or any other suitable structure for detecting the angular position of the rotor. The controller 112 may include circuitry for controlling the average magnitude of the phase energization currents (e.g., through pulse width modulation, bang-bang current control or the like) to control the magnitude of the reluctance torque output or the rotational speed of the machine 1.

In accordance with certain aspects of the present invention, the rotor 10 comprises a "solid" construction, rather than a laminated construction as in the prior art. To facilitate use of the solid rotor, the foil coil winding 26 may be potted, molded as part of the housing, or by some other means sealed or isolated from the rotor chamber to allow liquid or gas flow over or around the rotor 10 to allow the rotor to be cooled. The rotor 10 may also be designed to provide its own means for agitation of the cooling medium to provide cooling for both the rotor 10 and stator 20, thus providing more efficient operation.

Another aspect of this invention which could provide a smaller angle of rotation for each stator pole energization cycle adds a second, similar stator configuration on the opposite side of the rotor. Dependent upon the application, the rotor and stator surfaces could be coated with a suitable material by one or several of many processes to provide wear resistance, corrosion resistance, improved magnetic properties, or other special features as desired. Many of the specific features, size, power requirements, etc. will be dependent upon the application rather than limitations of the foil coil switched reluctance motor, as would be apparent to one skilled in the art having the benefit of this disclosure.

The novel foil coil windings provide the following benefits:
1. more efficient use of the winding space, 90% or more versus approximately 65% or less for conventional round wire.
2. a reduction of bulk conductor resistance by utilizing the skin effect for steep wavefront shapes which contain very high frequency components.
3. more efficient heat transfer from winding to the base due to the reduction of voids within the winding when compared with round wire.
4. Simplified scheme for providing back EMF sensing coil, inductively coupled current sensing coil or multiple voltage windings.

The provision of the semi-solid disc shaped rotor, as opposed to a laminated structure provides:
1. utilization of the eddy current principle within the Ferro magnetic material thus eliminating the need to laminate the rotor material.
2. Simplified and more economic fabrication techniques than required for a more conventional, laminated structure.

Moreover, the novel construction employing a single axial air gap allows for 1. reduced axial length for products such as sump pumps, ceiling fans, garbage disposer grind mechanisms, furnace blower motors, etc. which have air or water cooling integral to the product as part of the normal operation.
2. Simplified products since the rotor may be made an integral part of the fan hub, blower wheels, pump impellers, disposer grind mechanisms, etc.
3. A motor whose volumetric and electrical efficiency is high due to the single small air gap which can be controlled by relatively low cost standard manufacturing techniques.

The switched reluctance machine construction described herein is suitable for many applications including, but not limited to, food waste disposers, sump pumps, ceiling fans, furnace blower motors, etc. For example, known food waste disposers are often driven by single speed induction motors. Operating a food waste disposer at variable speeds is beneficial for many reasons. A food waste disposer having a variable speed motor is disclosed in the incorporated application Ser. No. 09/777,129, entitled "Food Waste Disposer Having a Variable Speed Motor," by Strutz et al.

In accordance with further aspects of the invention, a food waste disposer is powered by a switched reluctance motor. The switched reluctance motor could comprise a standard switched reluctance motor construction having a salient pole rotor disposed within a stator bore to define a radial air gap and flux path. Other embodiments are envisioned utilizing a pancake motor construction to reduce the vertical height of the disposer.

Figure 5:
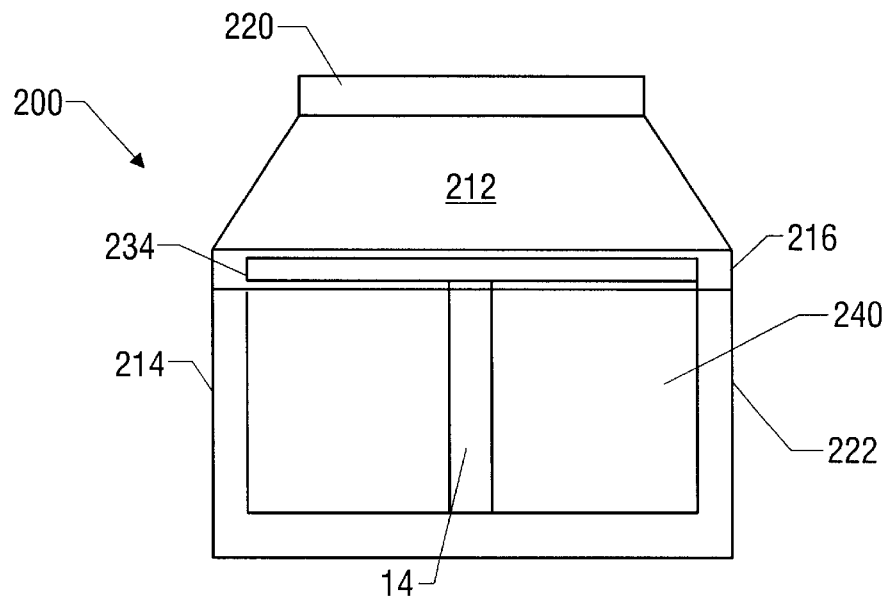
FIG. 5 is a block diagram conceptually illustrating a food waste disposer employing a switched reluctance machine.

FIG. 5 is a block diagram conceptually illustrating a food waste disposer in accordance with exemplary embodiments of the present invention. The disposer 200 includes a food conveying section 212, a motor section 214 containing a switched reluctance motor 240, and a central grinding section 216 disposed between the food conveying section and the motor section. The switched reluctance motor 240 includes a stator and a rotor that is coupled to a shaft 14.

The food conveying section 212 includes an inlet 220 at its upper end for receiving food waste. The food conveying section 212 conveys the food waste to the central grinding section 216. The grinding section 216 includes a grinding mechanism having a circular plate 234, a pair of lugs (not shown) that may be stationary (fixed lugs) or free to rotate (swivel lugs), and a stationary shredder ring (not shown). The grinding plate 234 is typically affixed to the motor shaft 14 and driven by the rotor of the switched reluctance machine 240.

The shredder ring, which includes a plurality of spaced teeth, is fixedly attached to an inner surface of the grinding section housing. In the operation of the food waste disposer, the food waste delivered by the food conveying section 212 to the grinding section 216 is forced by the lugs against the teeth of the shredder ring as the plate 234 is rotated by the motor 240. The sharp edges of the teeth grind the food waste into particulate matter sufficiently small to pass from above the grinding plate 234 to below the grinding plate 234 via gaps between the teeth outside the periphery of the plate 234. Due to gravity, the particulate matter that passes through the gaps between the teeth and, along with water injected into the disposer, is discharged from the disposer.

While conventional switched reluctance motors may be suitable for variable speed operation of food waste disposers in general, factors such as the motor profile, footprint, cost, etc. may render conventional switched reluctance motors impractical for use in some disposer applications. In one exemplary embodiment of the invention, a food waste disposer employs an axial air gap switched reluctance motor such as the machine 1 illustrated in FIGS. 1–4. Such a disposer is illustrated in FIG. 6.

Figure 6:
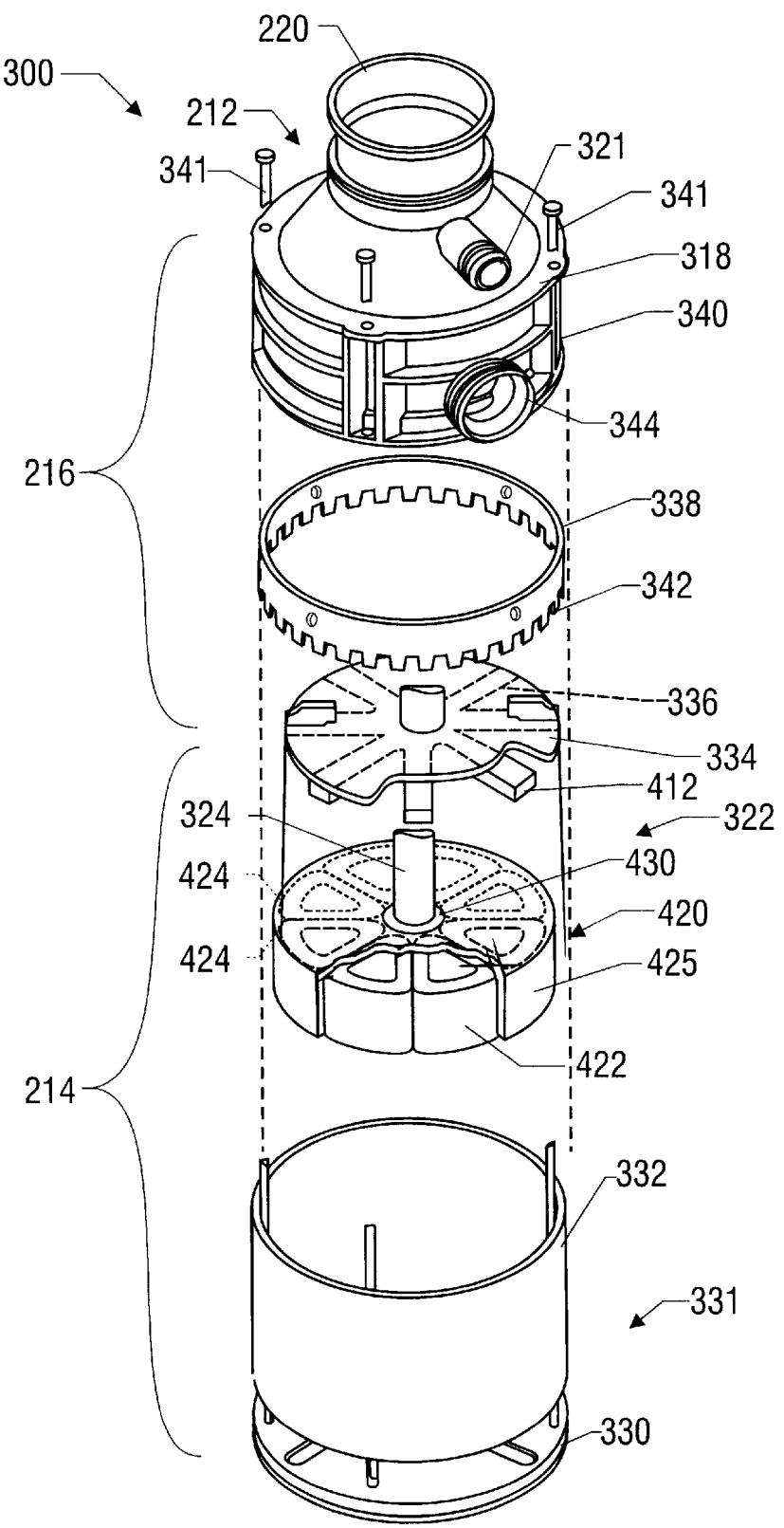
FIG. 6 is an exploded perspective view illustrating a food waste disposer employing a switched reluctance machine in accordance with an embodiment of the present invention.

FIG. 6 is an exploded perspective view of a food waste disposer 300 in accordance with aspects of the present invention. The disposer 300 may be mounted in a well-known manner in the drain opening of a sink using mounting members of the type disclosed in U.S. Pat. No. 3,025,007, which is owned by the assignee of the present application. The disposer 300 includes a food conveying section 212 having an injection-molded plastic housing 318 that forms an inlet 220 at its upper end for receiving food waste and water. The housing 318 also forms an inlet 321 for passing water discharged from a dishwasher (not shown). The food conveying section 212 conveys the food waste to the central grinding section 216. The motor section 214 includes a switched reluctance motor 322 which is enclosed within a motor housing 331 including a bent metal stator band 332 extending from a lower end frame 330.

The grinding section 216 includes a grinding mechanism having a rotating shredder plate 334 which, in the illustrated embodiment, is integrally formed with the rotor of the switched reluctance motor 322 as will be addressed further below. The grinding section 216 further includes a pair of lugs 336 and a stationary shredder ring 338. The plate 334 is mounted to the motor shaft 324 of the switched reluctance motor 322 and the lugs 336 are fastened to the plate 334. In the illustrated embodiment, the lugs are fastened to the plate 334 such that they do not rotate—they are "fixed" lugs. In other embodiments, the lugs are fastened such that they are free to rotate relative to the rotating plate 334.

The grinding section 216 includes an injection-molded plastic housing 340 integrally formed with the injection-molded upper housing 318 of the food conveying section 212. The integrated injection-molded plastic housings 318 and 340 form a unitary plastic enclosure. The enclosure 318, 340 is fastened to the lower end frame 330 by a plurality of bolts 341 having self-tapping threads. The shredder ring 338, which includes a plurality of spaced teeth 342, is fixedly attached to an inner surface of the housing 340 by an interference fit and is preferably composed of galvanized steel. Since the housing 340 is composed of injection-molded plastic instead of die-cast metal, the housing 340 is resistant to corrosion from the shredder ring 338.

The motor 322 of the motor section 214 is a foil coil switched reluctance machine such as that disclosed and described above in conjunction with FIGS. 1–4. The motor 322 includes a stator 420 having a plurality of foil coils 422 surrounding corresponding forms 424. A center post 430 provides support for a bearing and rotatably receives the motor shaft 324. A plastic over mold 425 covers the stator 420 and seals the foil coils 422. In other embodiments, alternative sealing means may be employed to seal the foil coils 422. A shaft seal is pressed into the center post 430 and a seal member is situated between the plastic over mold and the stator band 332 to prevent particulate matter and water from entering the motor housing 331. A PC board (not shown) including the drive electronics may be positioned below the stator 420 within the motor housing 331.

The rotating shredder plate 334 is attached to the motor shaft 324 and has an upper side (as viewed in FIG. 6) having the lugs 336 attached thereto, and a plurality of rotor poles 412 formed in its underside. The integral rotor/shredder plate 334 simplifies the disposer construction as compared to prior art disposers, which employ a separate shredder plate connected to a motor shaft that is driven by a separate rotor. Among other advantages, the combined rotor/shredder plate 334 reduces the profile of the disposer 300 thus reducing the space required for the installed disposer 300.

In the operation of the food waste disposer, the food waste delivered by the food conveying section 212 to the grinding section 216 is forced by the lugs 336 on the rotating plate 334 against the teeth 342 of the shredder ring 338. The sharp edges of the teeth 342 grind or comminute the food waste into particulate matter sufficiently small to pass from above the grinding plate 334 to below the grinding plate 334 via gaps between the teeth 342 outside the periphery of the plate 334. The particulate matter that passes through the gaps between the teeth 342 drops onto the plastic over mold 425 and, along with water injected into the disposer 300 via the inlet 220, is discharged through a discharge outlet 344. The discharge outlet 344 is threaded for connection to a tail pipe (not shown). To direct the mixture of particulate matter and water toward the discharge outlet 344, the plastic over mold 425 may be sloped downward toward its periphery. Fluid flowing over the plastic over mold 425 also functions to cool the motor 322.

The particular embodiments disclosed above are illustrative only, as the invention may be modified and practiced in different but equivalent manners apparent to those skilled in the art having the benefit of the teachings herein. It is therefore evident that the particular embodiments disclosed above may be altered or modified and all such variations are considered within the scope and spirit of the invention.

What is claimed is:

1. A food waste disposer comprising:
   an inlet for receiving food waste;
   a grinding plate coupled to a rotatable shaft for grinding the food waste; and
   a switched reluctance motor operable to drive the shaft.

2. The food waste disposer of claim 1, wherein the switched reluctance motor includes a stator having a plurality of stator poles disposed therein, the stator poles each comprising a winding made of a first foil layer.

3. The food waste disposer of claim 2, wherein the first foil layer is insulated on both sides.

4. The food waste disposer of claim 2, further including a second foil layer coupled to but insulated from the first foil layer.

5. The food waste disposer of claim 2, wherein the stator further comprises a base plate having forms supporting the windings.

6. The food waste disposer of claim 1, wherein the switched reluctance motor includes a stator having a central axis, and further including windings defining a core along the central axis.

7. The food waste disposer of claim 6, wherein the shaft is positioned in the core.

8. The food waste disposer of claim 7, wherein the switched reluctance motor further comprises a rotor coupled to the shaft, and wherein the rotor comprises a plurality of rotor poles.

9. The food waste disposer of claim 8, wherein the rotor is not included within the core.

10. The food waste disposer of claim 8, wherein the rotor poles extend radially from the central axis and over the windings, and wherein the rotor poles are spaced from the windings by an air gap.

11. The food waste disposer of claim 10, wherein the windings are wound around an axis parallel to the central axis.

12. The food waste disposer of claim 11, wherein the windings are made of a first foil layer.

13. The food waste disposer of claim 12, wherein the first foil layer is insulated on both sides.

14. The food waste disposer of claim 12, further including a second foil layer coupled to but insulated from the first foil layer.

15. The food waste disposer of claim 12, wherein the stator further comprises a base plate having forms supporting the windings.

16. The food waste disposer of claim 8, wherein the grinding plate is mechanically connected to the rotor.

17. The food waste disposer of claim 16, wherein the stator is protected by a seal.

18. The food waste disposer of claim 17, wherein the seal comprises a plastic covering the windings.

19. The food waste disposer of claim 2, further comprising a control circuit for selectively energizing the windings.

20. A food waste disposer comprising:
    an inlet for receiving food waste;
    a motor comprising
       a stator having a central axis and including windings, and
       a rotor having rotor poles extending radially from the central axis and over the windings, wherein the rotor poles are spaced from the windings by an air gap, and wherein no structure of the food waste disposer appears in the air gap between the rotor poles and the windings; and
    a grinding plate coupled to the rotor for grinding the food waste.

21. The food waste disposer of claim 20, wherein the motor is a switched reluctance motor.

22. The food waste disposer of claim 20, wherein the windings define a core along the central axis.

23. The food waste disposer of claim 22, wherein the rotor is coupled to a shaft positioned within the core.

24. The food waste disposer of claim 20, wherein the windings are made of a first foil layer.

25. The food waste disposer of claim 24, wherein the first foil layer is insulated on both sides.

26. The food waste disposer of claim 24, further including a second foil layer coupled to but insulated from the first foil layer.

27. The food waste disposer of claim 24, wherein the stator further comprises a base plate having forms supporting the windings.

28. The food waste disposer of claim 20, wherein the windings are wound around an axis parallel to the central axis.

29. The food waste disposer of claim 20, in the stator is protected by a seal.

30. The food waste disposer of claim 29, wherein the seal comprises a plastic covering the windings.

31. The food waste disposer of claim 20, further comprising a control circuit for selectively energizing the windings.

32. A food waste disposer comprising:
    an inlet for receiving food waste;
    a grinding plate coupled to a rotatable shaft for grinding the food waste; and
    a motor operable to drive the shaft, wherein the motor includes a stator having a plurality of stator poles, and wherein the stator poles each comprise a winding made of a first foil layer.

33. The food waste disposer of claim 32, wherein the motor is a switched reluctance motor.

34. The food waste disposer of claim 32, wherein the first foil layer is insulated on both sides.

35. The food waste disposer of claim 32, further including a second foil layer coupled to but insulated from the first foil layer.

36. The food waste disposer of claim 32, wherein the stator further comprises a base plate having forms supporting the windings.

37. The food waste disposer of claim 32, wherein stator has a central axis, and wherein the windings define a core along the central axis.

38. The food waste disposer of claim 37, wherein the shaft is positioned in the core.

39. The food waste disposer of claim 37, wherein the windings are wound around an axis parallel to the central axis.

40. The food waste disposer of claim 32, wherein the motor further comprises a rotor coupled to the shaft, and wherein the rotor comprises a plurality of rotor poles.

41. The food waste disposer of claim 40, wherein stator has a central axis, and wherein the windings define a core along the central axis.

42. The food waste disposer of claim 40, wherein the rotor is not included within the core.

43. The food waste disposer of claim 40, wherein the rotor poles extend radially from the central axis and over the windings, wherein the rotor poles are spaced from the windings by an air gap.

44. The food waste disposer of claim 43, wherein the grinding plate is connected to the rotor.

45. The food waste disposer of claim 32, wherein the stator is protected by a seal.

46. The food waste disposer of claim 45, wherein the seal comprises a plastic covering the windings.

47. The food waste disposer of claim 32, further comprising a control circuit for selectively energizing the windings.

* * * * *

UNITED STATES PATENT AND TRADEMARK OFFICE
CERTIFICATE OF CORRECTION

PATENT NO. : 6,648,252 B2
DATED : November 18, 2003
INVENTOR(S) : William F. Strutz It is certified that error appears in the above-identified patent and that said Letters Patent is hereby corrected as shown below:

<u>Title page, Item [54], Column 1, line 1,</u>
delete the words "SWITCHED RELUCTANCE MACHINE AND"

<u>Column 10,</u>
Line 49, delete "in" and insert -- wherein --

Signed and Sealed this

Twenty-fifth Day of May, 2004

JON W. DUDAS
*Acting Director of the United States Patent and Trademark Office*